INVENTOR.
SHERMAN NAYMARK

INVENTOR.
SHERMAN NAYMARK
BY Leslie M. Hansen
HIS ATTORNEY

United States Patent Office 3,752,738
Patented Aug. 14, 1973

3,752,738
NUCLEAR REACTOR PLANT AND MULTIPLE PURPOSE SHIELDING SYSTEM THEREFOR
Sherman Naymark, San Jose, Calif., assignor to Nuclear Services Corporation, Campbell, Calif.
Filed July 6, 1970, Ser. No. 52,384
Int. Cl. G21c *13/00*
U.S. Cl. 176—87
19 Claims

ABSTRACT OF THE DISCLOSURE

A multipurpose compartmented reactor building in which water fillable tankage dispersed about the pressure vessel and the containment vessel of a nuclear reactor provide primary shielding of a primary pressure boundry; secondary shielding in the containment vessel therefor as well as protection against missiles from within and/or without the building; the tankage further providing multiple and immediate sources of water for emergency cooling and for flooding the containment boundry around the pressure vessel in the event of vessel rupture to keep the reactor core submerged; the tankage and water therein serving to absorb the energy release generated in a nuclear accident; such tankage when empty rendering the building light enough to be floatable as a hull for transport from a place of the construction to mooring at a site of ultimate use where the water sustaining the hull serves as a seismic damper to the hull in the event of an earthquake.

BACKGROUND

This invention relates to a nuclear reactor plant and more particularly to a multipurposed compartmented water-sustainable construtcion for housing and shielding the nuclear reactor and primary coolant systems of such a plant.

Normally nuclear powered facilities serving as a central supply station for electrical power are built permanently on site as two separate buildings, one to house the electricity generator and associated machinery and the other, a reactor building, to house the steam generating and the primary heat removal system and associated safety equipment therefor. Due to the potential dangers inherent in the operation of nuclear reactors such as radiations released from the reactor core and/or steam and water released by a nuclear accident, the reactor building must be provided with considerable shielding to protect the personnel and equipment therein. For this reason it has been the practice to provide a very thick wall of reinforced concrete around the nuclear reactor pressure vessel as a primary shield defining the primary pressure boundry, the latter being further confined within a containment vessel likewise having a very thick wall of reinforced concrete to provide a secondary shield. In connection with the foregoing and to protect the containment vessel from damage by missiles, compartments formed from heavy concrete are constructed strategically around the containment vessel inside and outside the building.

In addition thereto either a large volume containment vessel or a great source of water is used to absorb the energy released within the containment vessel in the event of a break in the primary pressure boundary. This water source, or an additional one, is generally used as a supply of water for emergency reactor core cooling systems.

Also some present known reactor designs provide for a special water retaining structure around the reactor pressure vessel so that in event of a leak, the water run-off is retained to keep the reactor core submerged.

It should be further understood that the reactor building itself and all the vital equipment within it must be supported in such a manner as to accept seismic shock from the worst possible earthquake without loss of function. This necessarily requires heavy foundation and support structure for such permanent building.

As a result of all this heavy construction the structure is a massive reactor building of about 100,000 tons over 75% of which being reinforced concrete.

STATEMENT OF INVENTION

This invention contemplates the utilization of water tankage and compartments therefor so designed and located within the reactor building that they can serve for multiple purposes and functions which had theretofore required a multiplicity of devices in addition to the structure itself. Specifically, this object contemplates such water tankage serving when filled to provide primary and secondary shielding while retaining the same water in such tankage to absorb the energy of an inadvertent nuclear accident; the same water filled tankage further functioning to protect both the reactor pressure vessel and the inside and outside surfaces of the containment vessel from missiles and to be available to provide a boundary wall around the reactor pressure vessel so that in event of a leak in the pressure vessel, the retaining boundary will fill with such water and keep the core submerged; these same water filled tankages further providing multiple sources of emergency cooling water for the reactor core.

Another object of this invention is to reduce the overall plant cost by multiple uses of the water tankage shielding system.

It is another object of this invention to eliminate the need for the massive volume of concrete of present reactor buildings whereby the water tankage when empty facilitates construction of the reactor building as a hull in a shipyard or other convenient location. In this connection it is a further object to provide such a multi-compartmented building having water tankage in which, when such tankage is empty, the building will have a dry weight to render the hull type structure buoyant for movement by waterway to the operating site for mooring adjacent to its mating turbine generator installation; the tankage structure thereafter upon being filled with water providing the shielding and source of water required for the operating mode.

It is yet another object of this invention to provide a relatively light hull type reactor building which can be berthed in water such that this water serves as secondary shielding, thereby reducing the need for built-in shielding as is required around the bottom portions of the reactor. In connection with this object the berthing water thereby serves as a seismic damper to the hull, thus minimizing the amount and cost of restraints and supporting structure normally required inside the reactor building.

It is yet another object of the present invention to provide in such a multipurposed compartmented building, shielding tankage around the spent fuel storage chamber as well as the reactor internals storage compartment required during fuel reloading.

The above and other objects and advantages of the invention will appear more fully hereinafter from a consideration of the detailed description which follows taken together with the accompanying drawings, in which.

GENERAL DESCRIPTION

Figure 1:
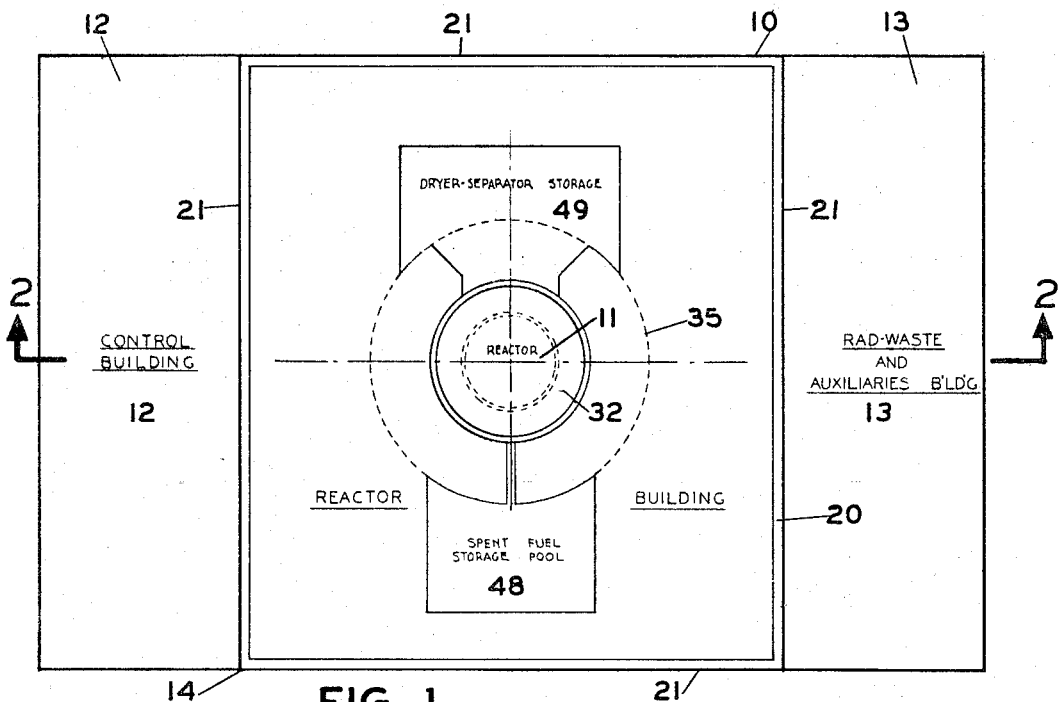
FIG. 1 is a plan view of a reactor building suitable for the embodiment of the present invention.

Referring to the drawings the building 10 is constructed entirely of structural steel and steel plate calculated to withstand the stresses as required and welded together as a complete enclosure for housing a nuclear reactor pressure vessel 11 and primary coolant system. In general the building 10 may be rectangular, square or any form necessary to the particular installation required. For purpose of the present disclosure the boiling water reactor plant concept is shown to house a truncated cylindrical containment vessel. However the invention herein is equally adaptable for housing a pressurized water reactor plant or other type plant within other geometric containment vessels appropriate to take advantage of the benefits of the present invention.

Figure 2:
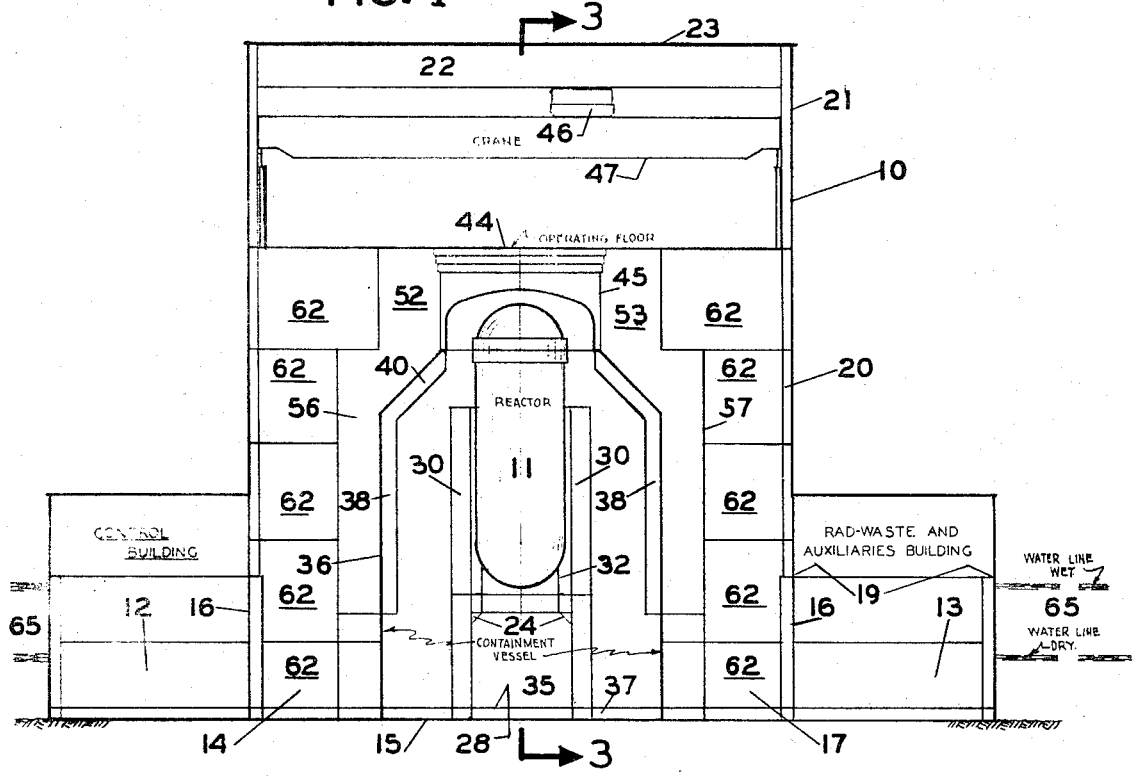
FIG. 2 is a section through FIG. 1 taken along line 2—2 thereof.

While FIGS. 1 and 2 illustrates a reactor building 10 having adjacent wings for a control building 12 and an auxiliary building 13 attached the inventive concept is primarily concerned with the construction of the main building 10 within which the reactor pressure vessel 11 is housed.

Referring to FIGS. 2, 3, 4 and 6 the building 10 has a substructure 14 including a bottom plate 15 and side plates 16 welded into a water-tight hull type base 17. This base 17 has internal plating 15' and 16' spaced from the bottom plate 15 and side plates 16 by columner ribbing 18 in the usual manner of ship construction. This hull type base 17 has an upper or gunnel plate 19 from which the outer walls of the super structure 20 of the building extends upwardly. The outer walls of the superstructure 20 are steel plate 21 supported on columns 17' based upon the plate 19 and united at their upper ends by a truss 22 and a covering roof 23.

Figure 4:
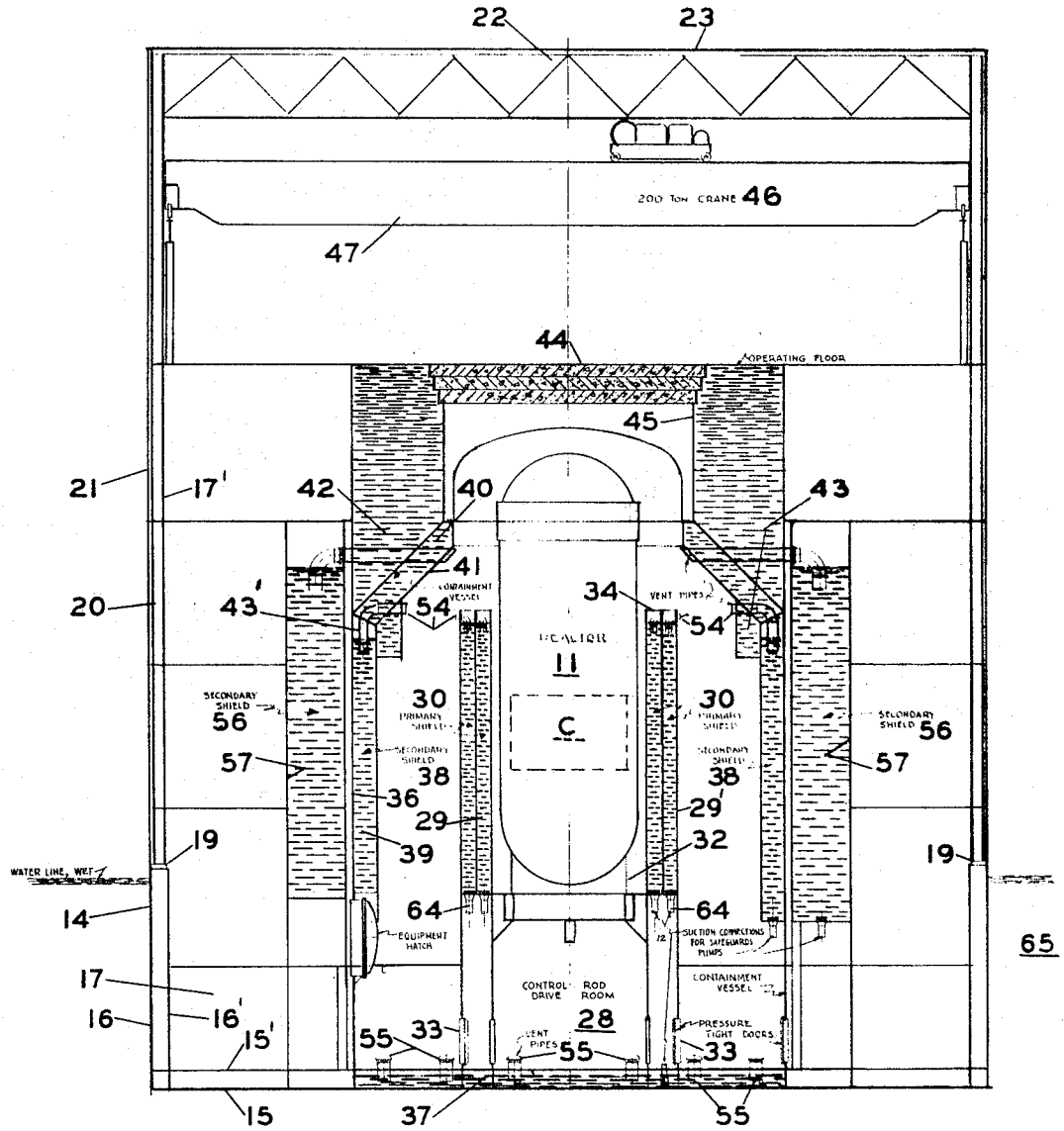
FIG. 4 is a section through the main building only of FIG. 3 and taken along line 4—4 thereof.

The nuclear reactor pressure vessel 11 is located substantially centrally within the building 10 in spaced relation to the hull type base 17 thereof. The nuclear reactor pressure vessel 11 is supported on brackets 24 extending inwardly from a leg structure 25 consisting of concentric cylindrical walls 26–26' united by radial webs 27 and having their lower ends welded to the bottom plates 15–15' to provide a water tight cup-like base 28 below the reactor vessel. The inner diameter of the leg structure 25 is slightly greater than the outside diameter of the reactor vessel 11 and supports a pair of cylindrical tanks 29–29' which confine within vertical extensions of the concentric cylindrical walls 26–26', respectively, of the leg structure. The inner and outer tanks 29 and 29' are bottomed at the brackets 24 and extend upwardly to circumscribe the reactor pressure vessel 11 in the zone of the most intense emission of radio active radiations from the core C of the reactor. By this arrangement, the tanks 29–29' when filled with water serve to provide a primary shield 30 around the reactor 11. They also serve with the cup-like base 28 below to provide a water tight receptacle 32 which, in the event of reactor pressure failure, will automatically fill up with water pumped into the core C and eventually keep the core submersed for emergency cooling purposes. Under normal operation, however, this water tight receptacle 32 is empty and the cup-like base 28 thereof consists of a control rod drive room access to which may be had through pressure tight doors 33 provided in the outer cylindrical wall 26' as shown in FIG. 4.

The reactor 11 and the primary shield 30 thus formed is confined within a containment vessel 35. The containment vessel 35 in the present disclosure is likewise a cylindrical structure concentric to the reactor 11 and the primary shield 30, but spaced therefrom to provide a pressure zone around the reactor vessel and the water tight receptacle 32.

The containment vessel 35 is shown in the form of a truncated cylindrical shell 36 having its lower end supported on the bottom plate 15 and cooperating therewith to form an inner bottom tank 37 between the plates 15 and 15' for retaining water and thereby provide a secondary shield against radioactive radiations deflected downwardly from the main reactor vessel 11.

A secondary cylindrical shield 38 is formed by the provision of a tank 39 attached to the inner wall of the shell 36 from a level slightly below the primary shield 30 or tankage 29–29' and up to a level where the containment vessel becomes truncated. At the upper level of the tank 39 a secondary shield 40 in the form of a truncated cone shaped tank 41 extends inwardly and upwardly to a level of a closure formed by the dome-like cap 34 for the containment vessel 35. This cap 34 has a diameter approximating the outer cylindrical wall 26' of the tank 29' of the primary shield 30. The upper end of the shell 36 forming the containment vessel 35 is further shielded secondarily by collar tankage 42 and 43 which when filled with water shield the annular triangular void 42' and overlap the gap 43' between the upper level of the tank 39 and the truncated cone shaped tank 41, respectively.

Figure 3:
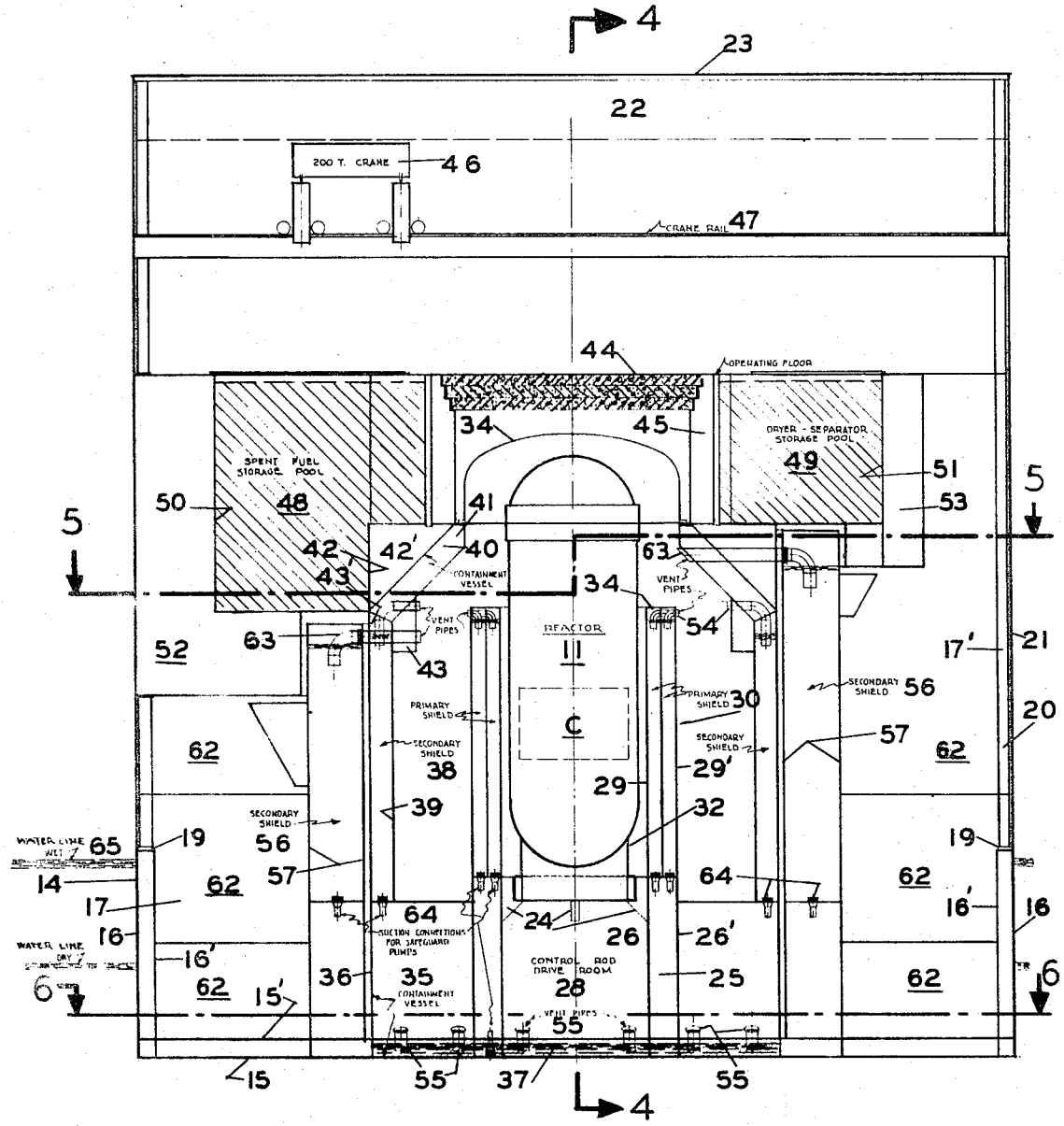
FIG. 3 is a section through FIG. 2 taken along line 3—3 therein and at slightly larger scale with respect thereto and illustrating the embodiment of the present invention therein.
Figure 5:
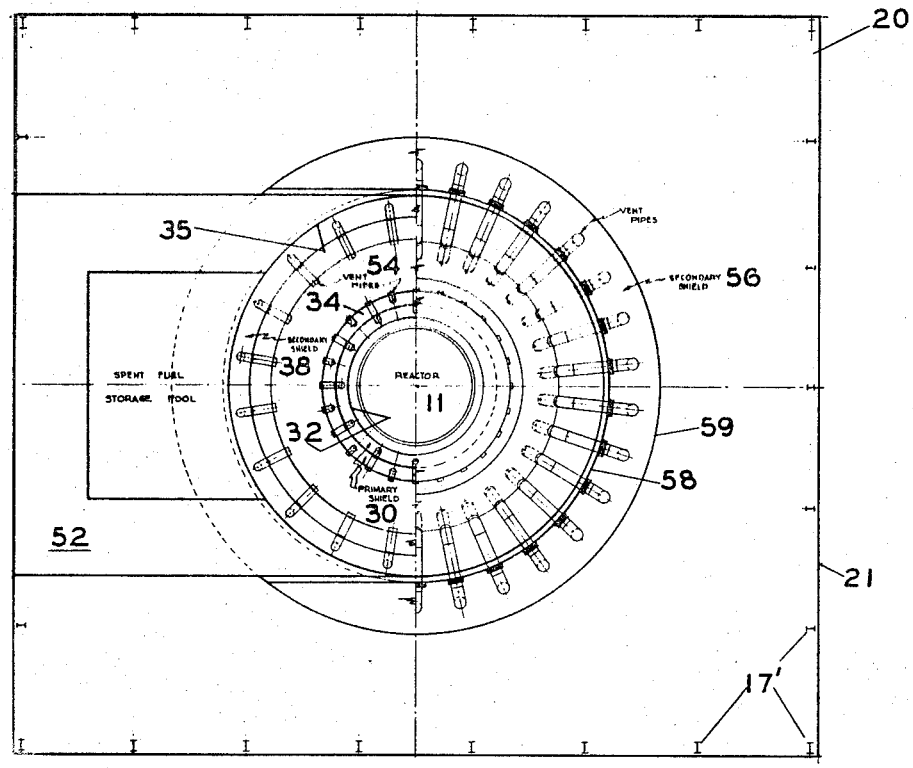
FIG. 5 is a horizontal section through FIG. 3 taken substantially along lines 5—5 therein.

Above the containment vessel 35 removable covers 44 are supported on a cylindrical tank construction 45, through which covers access may be had to the core C of the uncapped reactor 11 for removing and replacing spent fuel. This is accomplished by an overhead crane 46 traveling on rails 47 supported on the superstructure walls for transporting the spent fuel for temporary storage in a spent fuel storage pool 48 and the dryer separator to storage pool 49 constructed by tankage 50 and 51, respectively, diametrically disposed adjacent the upper end of the containment vessel 35. These auxiliary chambers 50 and 51 are shielded by water fillable tankage 52 and 53, respectively, surrounding the same in the manner as illustrated in FIGS. 3 and 5.

So far as the basic operation of the plant is concerned the main tankage such as the primary shield 30 and the secondary cylindrical shield 38 would suffice under normal conditions. The tanks 29–29', 37 and 39 are all provided with vents communicable with the voids within the containment vessel 35. By this arrangement in the event of a primary coolant boundry failure, the energy released in the radioactive fluids will be absorbed by the water in these tanks, thereby preventing overpressurizing of the containment vessel. As best seen in FIGS. 3, 4 and 5 the primary and secondary cylindrical shields 30 and 38 have elbow type vent pipes 54 mounted with one open end emersed in the shielding water adjacent the upper ends of the respective tanks 29–29' and 39'. Any escape of pressurized fluid will thus be directed into the tankage 29–29' and 39 and the shielding water in these tanks will absorb the energy contained in escaping fluid in the event of equipment wall failure. The expansion of the shielding water in these primary and secondary shields will therefore overflow out of the vents 54 and yet be retained within the containment vessel 35. It should here be noted that all of these tanks 29–29' and 39 are internally compartmented and the compartments thereof individually vented as indicated in FIG. 5. By this arrangement in the event of a leak in any one compartment of such tankage 29–29' and 39 the loss of only a limited amount of water would occur and adequate shielding and energy removal capability would still remain in the rest of the shielding tankage system.

Figure 6:
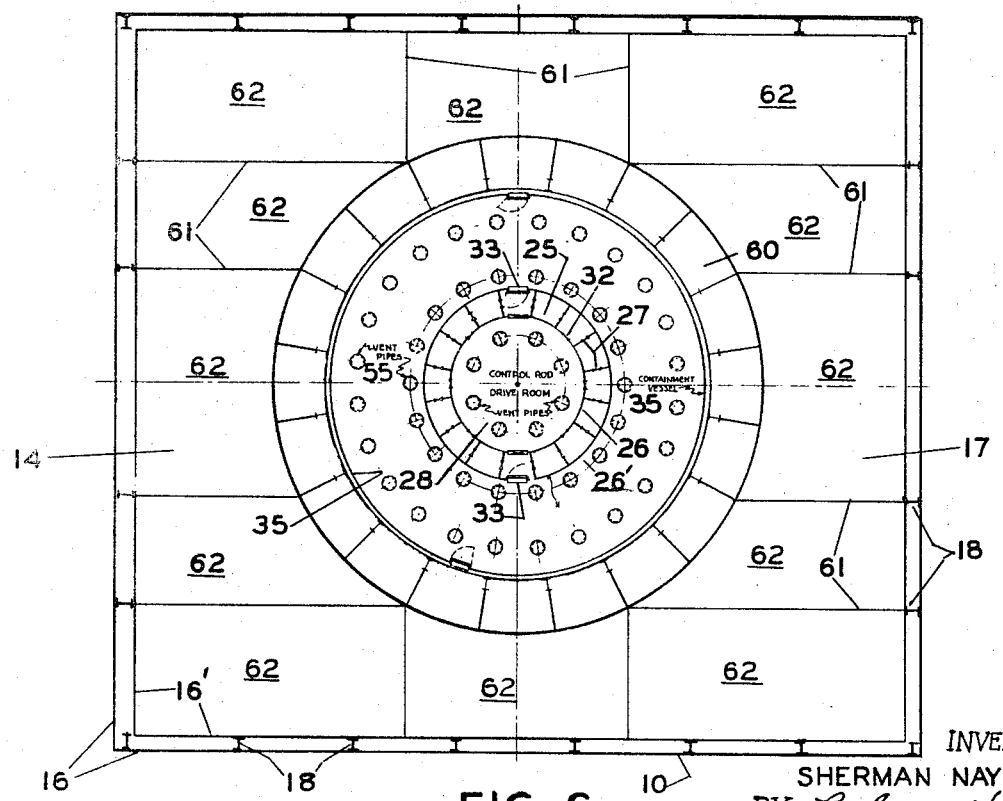
FIG. 6 is a horizontal section through the main building of FIG. 3 and taken along line 6—6 therein.

The bottom tank 37 which likewise contains water for shielding purposes is also vented by a plurality of mushroom type vents 55 which extend through the upper plate 15' (FIGS. 4 and 6). Some of these vents 55 are within the cup-like control room 28 at the base of the water tight receptacle 32. Outside the control room 28 other mushroom vents 55 discharge into the base of the containment vessel 35. By this arrangement the water shield contained in the bottom tank 37 will also absorb the energy contained in escaping radioactive contaminated fluid and be allowed to expand into the confines of the containment vessel 35 and base cup 28.

Further secondary and outside shielding 56 as required is provided by tankage 57 formed around the perimeter of the containment vessel 35. This tankage 57 as best seen in FIGS. 3, 4 and 5 comprises an inner cylindrical wall 58 spaced from the cylindrical wall of the shell 36 and an outer cylindrical wall 59 concentric to the wall 58 and united therewith by radial partitions 60 (FIG. 6) to provide individual water retaining compartments in the outside secondary shielding 56. The tankage 57 is provided in the zone of the primary and secondary shielding 29–29' and 39, the lower ends of the inner and outer cylindrical support walls 58 and 59 extending upwardly from the bottom plates 15–15' of the hull type base 17 of the substructure 14. The outer cylindrical wall 59 is further braced by partitions 61 at different levels within and between the outer walls 21 and columns 17' of the superstructure 20 of the building 10. These partitions 61 provide compartments 62 around the outer walls of the building for equipment required in the operation of the plant. This outside shielding 56 not only protects the outer compartments 62 of the building from radioactive radiation from within the containment vessel 35, but also serve as protection to the latter for missile damage from ouside the building. Venting of the containment vessel to this outer secondary shielding 56 may be provided by elbow vent pipes 63 having their vertical ends emersed in the shielding water 56 and their horizontal portions penetrating the shell 36 of the containment vessel 35 at the collar tankage 42 and 43 (FIGS. 3, 4 and 5). Suitable bellows and water tight connections are provided where the vent pipes 63 penetrate the cylindrical wall 36 of the containment vessel. By venting to the outer secondary shielding in this manner the shielding water therein may be used if the water required inside the containment vessel 35 to absorb the energy created therein is inadequate.

Suction connections 64 are provided in the several primary an dsecondary shields as shown in FIG. 3 to provide shield water cooling and/or second level energy removal of the energy absorbed due to postulated accident as well as a source of water for emergency cooling of the core C. These same connections 64 can be commonly used for one or the other of the three needs for water by proper routing to those systems in the plant assigned to these functions.

It will now be apparent that the above described invention provides a novel and effective arrangement whereby water tankage uniquely located, as described, around the reactor pressure vessel 11, the containment vessel 35 and other radioactive sources serves the multiple functions of (A) radiation shielding; (B) absorption of energy of hot radioactive fluids from a plant accident; (C) missile protection to the reactor and containment vessels, (D) a steel cup or receptacle 32 in which to water submerge the reactor core in event of pressurue vessel leak, and (E) as emergency cooling water sources. By combining all of these functions into one water tankage system as described, very large weights, which in the present conventional plants are reinforced concrete for shielding and structure and separate large energy absorbing vessels or separate energy absorbing pools of water, are considerably reduced. Thus calculations for a typical plant show that the total weight of the reactor building 10 and its machinery content can be reduced by a factor of three over present concepts. However, this invention further reduces the weight of the reactor building by another factor of 2 when the tankage is empty. This relatively light weight of the building when devoid of the water in the tankage allows the entire reactor building 10 to be constructed as a water sustainable steel hull 17. Such steel hull and superstructure can be built in more convenient construction facilities removed from the normally isolated area where the plant is to be set up and operated. Such more convenient facilities could include, but not be limited to, places like shipyards with large drydock facilities.

The entire machinery contents of the reactor building hull could be installed at this building site and then moved, with the multiple purpose shielding tankage system empty, to the operating site where it would be securely berthed adjacent to the turbine building. The multiple purpose shielding tankage system would then be filled with water and the hull would settle to its operating depth. After proper steam and feed line connections are made between the two buildings, with such connections allowing for some relative movement between the two buildings during operation, the plant is ready to start operation.

FIG. 2 shows such a reactor building hull 17 with its installed equipment, and with two adjacent wing tanks housing the control room 12, and the radioactive waste processing facility 13. The relatively shallow depth at which it would float for movement from the construction site to the operating site is shown as water line dry whereas water line wet is the draft depth at which it would float when the shielding tankage system is filled with water. Calculations made for typical large central station nuclear power plant designs show that the relatively shallow draft during hull movement would allow passage to many ocean front, bay, river and lake areas where nuclear plants are normally sited.

At the operating site, the water in which the reactor building hull is berthed and the draft of part of the hull immersed to waterline wet would act as shielding 65 (FIGS. 2 and 4) for absorbing radiations from the hull and protecting personnel in adjacent buildings during operation. This minimizes the required secondary shielding inside the hull in areas low in the hull 17, which will be below water level during operation. This same water in which the hull is berthed also acts as an hydraulic damper protecting the hull and its machinery contents from the accelerating forces in the designed required maximum expected earthquake. This would minimize requirements for heavy structural supports, dampers and snubbers normally required to accommodate these acceleration forces.

It will now further be apparent that as a result of the above described invention of a multiple purpose shielding system, it is possible to reduce the weight of the reactor building to such a significant extent as to make it readily feasible to be constructed as a hull with machinery installed at a convenient construction site and moved at relatively shallow draft with the shield system tankage empty, to the operating site where the shielding tankage is filled with water. The berthed water then provides additional shielding and seismic damping so as to reduce the weights and costs of these requirements normally built into a nuclear reactor plant.

Although one embodiment of the present invention has been shown and described in detail, it is to be expressly understood that the present invention is not limited thereto. Various changes can be made in the design and arrangements of the parts without departing from the scope of the invention. Also, applications to types of reactor plants other than that illustrated, such as pressurized water, liquid metal and gas cooled, can be made within the spirit and scope of this invention. Various shapes of containment vessels such as cylinders, partial spheres, cones and other shapes can also utilize the multipurpose shielding system of this invention to advantage. Therefore, it is intended that all subject matter contained in the foregoing description or shown in the accompanying drawings shall be interpreted as illustrative and not in a limiting sense, but within the scope and purview of the appended claims.

What I claim as new and desire to protect by Letters Patent is:

1. In a steel constructed building for housing a nuclear reactor pressure vessel and associated machinery of a primary heat removal system connectable to an electrical power generating plant, a multipurpose compartmented shielding system comprising in combination:

(1) an all steel water sustainable hull type substructure forming a bottom for such building;

(2) a water tight cup-like steel constructed receptacle having a wall supported substantially centrally of such building and having a base formed as a part of the bottom of said hull type substructure;

(3) means on the base of said cup-like receptacle for supporting such nuclear reactor pressure vessel in spaced relation to the bottom of said hull type substructure;

(4) water fillable steel tankage formed on the wall of said cup-like receptacle above the base thereof and in the zone of the core of the reactor pressure vessel supported thereon for providing, when filled with water, a primary shield against radioactive radiations from such reactor pressure vessel;

(5) a water and pressure tight steel constructed containment vessel supported on the bottom of said hull type substructure within such building and around said cup-like receptacle and reactor pressure vessel, said containment vessel having water fillable tankage formed on its inner vertical wall in spaced relation to the primary shield provided on the wall of said cup-like receptacle for providing, when filled with water, a secondary shield about the latter and the nuclear reactor pressure vessel therein; and (6) bottom tankage formed on the bottom of said hull type substructure below said containment vessel and cup-like receptacle and serving when filled with water to provide a secondary shield against radioactive radiations deflected downwardly from the nuclear reactor pressure vessel.

2. In a steel constructed building for housing a nuclear reactor vessel and associated machinery of a primary heat removal system connectable to an electrical power generating plant, a multipurpose compartmental shielding system comprising in combination:

(1) an all steel water sustainable hull type substructure forming a bottom for such building;

(2) a water tight cup-like steel constructed receptacle having a wall supported substantially centrally of such building and having a base formed as a part of the bottom of said hull type substructure;

(3) means on the base of said cup-like receptacle for supporting said nuclear reactor pressure vessel in spaced relation to the bottom of said hull type substructure;

(4) water fillable steel tankage formed on the wall of said cup-like receptacle above the base thereof and in the zone of the core of the reactor pressure vessel supported thereon for providing, when filled with water, a primary shield against radioactive radiations from such reactor pressure vessel;

(5) a water and pressure tight steel constructed containment vessel supported on the bottom of said hull type substructure within such building and around said cup-like receptacle and reactor pressure vessel, said containment vessel having water fillable tankage formed on its inner vertical wall in spaced relations to the primary shield provided on the wall of said cup-like receptacle for providing, when filled with water, a secondary shield about the latter and the nuclear reactor pressure vessel therein; and (6) bottom tankage formed on the bottom of said hull type substructure below said containment vessel and cup-like receptacle and serving when filled with water to provide a secondary shield against radioactive radiations deflected downwardly from the nuclear reactor pressure vessel, (7) the multipurpose compartmented shielding system of the tankage serves when empty to render such building floatable at shallow draft in a body of sustaining water and including means for filling said tankage with water to submerge the hull type substructure from a shallow draft in such body of sustaining water to a depth wherein the surface level of the body of sustaining water is above the lower extremity of the secondary shield provided by the tankage on said containment vessel whereby the body of sustaining water surrounding said hull type substructure serves as a secondary sheld against radioactive radiation emitting from said hull and as a damper against seismic shock from possible earthquakes thereto.

3. The building in accordance with that of claim 2 in which said cup-like receptacle serves to retain hot radioactive fluids escaping from the reactor pressure vessel in the event of plant accident thereto whereby such vessel becomes submerged in such escaping fluid to cover the fuel therein and to absorb the energy therefrom.

4. The building in accordance with that of claim 3 including primary vent pipes communicating the upper end of the tankage formed on the wall of said cup-like receptacle with the interior of said containment vessel whereby the water in the tankage of said primary shield absorbs the energy from a primary coolant system pipe break as well as hot radioactive fluids accidentally escaping from said reactor vessel into said cup-like receptacle.

5. The building in accordance with that of claim 4 including secondary vent pipes communicating the upper end of the tankage formed on the inner wall of said containment vessel with the interior of the latter whereby the water of said secondary shield effects further absorption of energy from a primary coolant system pipe break as well as from radioactive fluids in the event of accidental escapement thereof into said cup-like receptacle.

6. The building in accordance with that of claim 5 including mushroom vents between the bottom tankage and the lower regions of said containment vessel whereby the water in said bottom tankage affords further absorption of energy from a primary coolant system pipe break as well as from the hot radioactive fluids in the event of escapement thereof from the reactor pressure vessel.

7. The building in accordance with that of claim 6 including a spent fuel storage pool compartment and a vessel internals storage pool compartment and means for transporting the spent fuel and internals from and to the pressure vessel relative to such storage pools; the combination therewith of auxiliary water fillable tankage surrounding said spent storage pool and vessel internal storage compartments, and means for filling such auxiliary tankage with water for shielding and for providing an emergency cooling water source.

8. The building in accordance with that of claim 6 including an outside secondary shield around the containment vessel in the zone of said primary and secondary shielding tankage therein comprising inner and outer tankage walls spaced from each other by internal webbing for providing a plurality of independent and separate water fillable tanks therein.

9. The building in accordance with that of claim 8 including auxiliary vent pipes penetrating the vertical wall of said containment vessel in the region of the upper end of said outside secondary shielding tankage whereby the water in the latter affords still further absorption of the energy from the hot radioactive fluids as well as from escaping fluids from a primary vessel and pipe break in the event of such accident.

10. The building in accordance with that of claim 9 including collar tankage formed as a truncated cone within said containment vessel adjacent the open upper end of said cup-like receptacle serving when filled with water as a secondary shield against radioactive radiation from the upper end of the reactor pressure vessel.

11. The building constructed in accordance with that of claim 10 in which the shielding water contained in the primary, secondary, outside and auxiliary tankage serves as multiple sources of emergency water supply of cooling water in the event of emergency needs.

12. The building constructed in accordance with that of claim 11 wherein the primary, secondary, outside and auxiliary tankage provides protection to the reactor pressure vessel against missile damage from within and outside the containment vessel.

13. The building constructed in accordance with that of claim 12 including a plurality of partitioned compartments formed within the outer walls of such building and around the outside auxiliary tankage shielding said containment vessel for protecting the latter and said reactor pressure vessel against missile damage from outside the building.

14. A structure for containing a nuclear reactor comprising:
   (a) a housing;
   (b) a dry water tight receptacle disposed in said housing;
   (c) a nuclear reactor vessel with a core mounted in said dry water tight receptacle;
   (d) a plurality of radially spaced, concentric water filled radiation shield containers surrounding said dry water tight receptacle for providing respectively a primary radiation shield and a secondary radiation shield against radioactive radiation; and
   (e) means communicating with one of said water filled containers and said dry water tight receptacle through an accidental break in said reactor vessel for conducting fluid from said one water filled container and into said water tight receptacle for keeping the core submerged during decay heat removal in the event of reactor pressure failure.

15. A structure as claimed in claim 14 and comprising means communicating with another of said water filled containers and said dry water tight receptacle through an accidental break in said reactor vessel for conducting fluid from said other water filled container and into said water tight receptacle for keeping the core submerged during decay heat removal in the event of reactor pressure failure.

16. A structure for containing a nuclear reactor comprising:
   (a) a housing;
   (b) a dry water tight receptacle disposed in said housing;
   (c) a nuclear reactor vessel with a core mounted in said dry water tight receptacle;
   (d) a plurality of radially spaced, concentric water filled containers surrounding said dry water tight receptacle for providing respectively a primary radiation shield and a secondary radiation shield against radioactive radiation; and
   (e) means communicating with one of said water filled containers and said dry water tight receptacle through an accidental break in said reactor vessel for conducting fluid between said one water filled container and said water tight receptacle for keeping the core submerged during decay heat removal in the event of reactor pressure failure;
   (f) said housing comprising a hull type structure arranged to support said water tight receptacle, said nuclear reactor vessel, said water filled container and said means, said hull type structure being floatable in water and of a lesser draft when said containers have less water therein.

17. A structure for containing a nuclear reactor comprising:
   (a) a housing;
   (b) a dry water tight receptacle disposed in said housing;
   (c) a nuclear reactor vessel with a core mounted in said dry water tight receptacle;
   (d) a plurality of radially spaced, concentric water filled containers surrounding said dry water tight receptacle for providing respectively a primary radiation shield and a secondary radiation shield against radioactive radiation; and
   (e) means communicating with one of said water filled containers and said dry water tight receptacle through an accidental break in said reactor vessel for conducting fluid between said one water filled container and said water tight receptacle for keeping the core submerged during decay heat removal in the event of reactor pressure failure;
   (f) said housing comprising a building and a hull type structure disposed in said building, said hull type structure being arranged to support said water tight receptacle, said nuclear reactor vessel, said water filled containers and said means, said hull type structure being of a deeper draft in said building when said containers have a greater quantity of water therein.

18. A structure as claimed in claim 17 and comprising means communicating with another of said water filled containers and said dry water tight receptacle through an accidental break in said reactor vessel for conducting fluid between said other water filled container and said water tight receptacle for keeping the core submerged during decay heat removal in the event of reactor pressure failure.

19. A structure as claimed in claim 16 wherein said housing also includes a building in which said hull type structure is disposed, said hull type structure being of a deeper draft in said building when said containers have a greater quantity of water therein.

References Cited

UNITED STATES PATENTS

| | | | |
|---|---|---|---|
| 3,022,238 | 2/1962 | Kolflat | 176—87 |
| 3,454,466 | 7/1969 | Pitt et al. | 176—38 |
| 3,047,485 | 7/1962 | Ellis | 176—87 |
| 3,446,171 | 5/1969 | Panoff et al. | 176—87 |
| 3,415,067 | 12/1968 | Wolff | 61—46.5 |
| 3,262,411 | 7/1966 | Kaltenecker | 114—.5 R |
| 3,115,450 | 12/1963 | Schanz | 176—87 |
| 3,318,780 | 5/1967 | Bohmann et al. | 176—87 |

FOREIGN PATENTS

| | | | |
|---|---|---|---|
| 1,011,639 | 12/1965 | Great Britain | 176—87 |

REUBEN EPSTEIN, Primary Examiner

U.S. Cl. X.R.

114—.5 F